Figure 1:
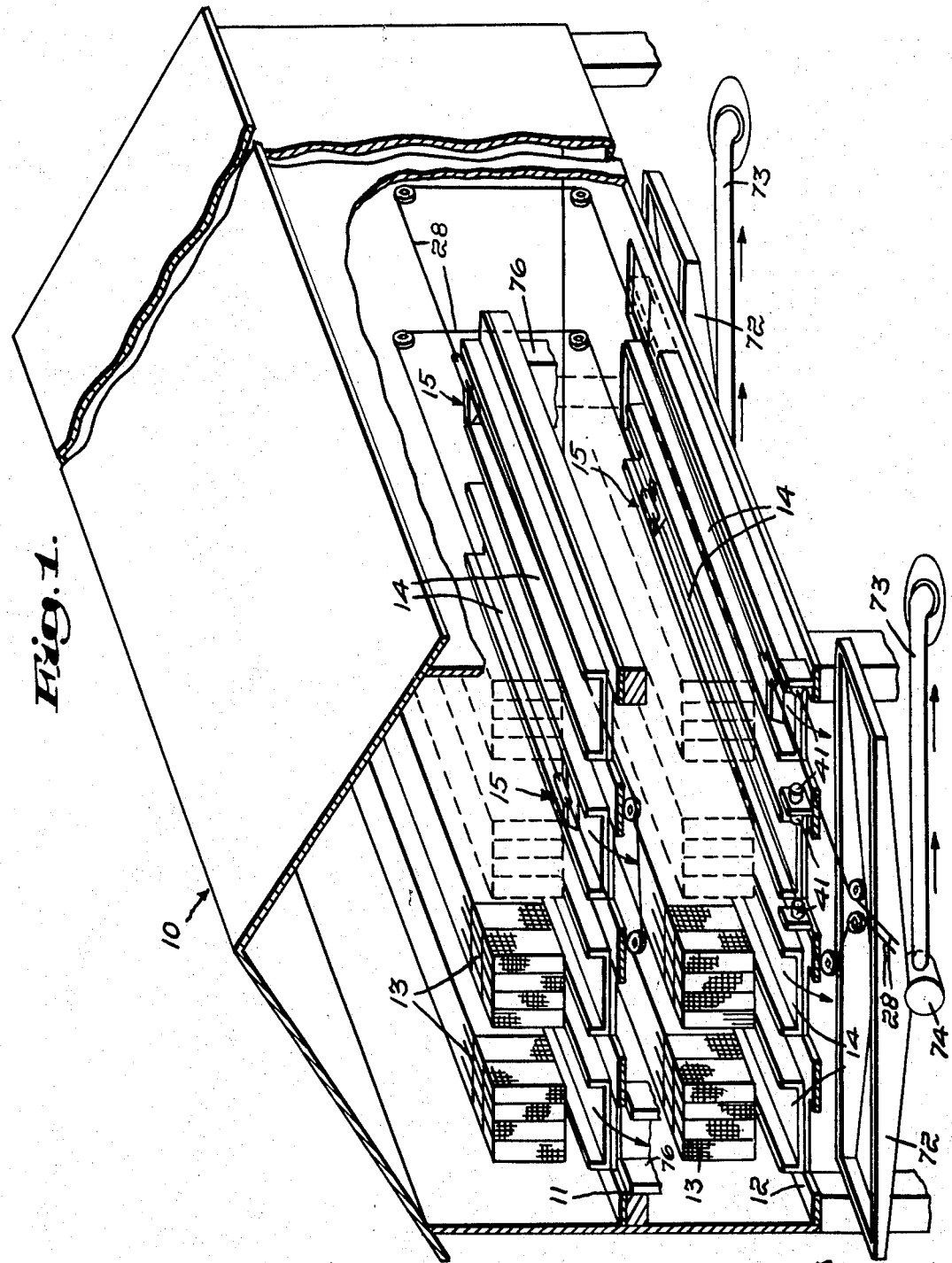

United States Patent

[11] 3,530,832

[72] Inventor Allen H. De Satnick,
   Wellesley Hills, Massachusetts
[21] Appl. No. 718,622
[22] Filed April 3, 1968
[45] Patented Sept. 29, 1970
[73] Assignee De Mag Engineering, Inc.,
   Watick, Massachusetts
   a corporation of Massachusetts

[54] APPARATUS FOR USE IN REMOVING MANURE FROM BUILDINGS HAVING MANURE COLLECTING CHANNELS
16 Claims, 5 Drawing Figs.

[52] U.S. Cl. .................................................. 119/22, 198/224, 119/28
[51] Int. Cl. ................................................... A01k 31/04
[50] Field of Search .......................................... 119/22, 28, 48; 198/221, 224X, 229, 82

[56] References Cited
UNITED STATES PATENTS

| | | | |
|---|---|---|---|
| 2,303,649 | 12/1942 | Livingston | 37/120 |
| 2,307,984 | 1/1943 | Brand | 119/22 |
| 2,491,245 | 12/1949 | Bergman | 119/28 |
| 2,785,790 | 3/1957 | Bruecker | 198/224 |
| 2,970,567 | 2/1961 | Rubin | 119/22 |
| 3,033,348 | 5/1962 | Andrew | 198/82 |
| 3,100,043 | 8/1963 | Cordis | 198/224 |
| 3,240,323 | 3/1966 | Kitson | 198/224 |

*Primary Examiner*—Aldrich F. Medbery
*Attorney*—Abbott Spear

ABSTRACT: Apparatus for use in removing manure from buildings of the type provided with manure collecting channels, the apparatus having scraper means for each channel, each scraper means being movable lengthwise thereof in both directions but operable only when travelling towards the discharge end. The drive for the scraper means has a control responsive to the return of a scraper means into a loaded position, and, for remote control, the drive has a detachable cable connection with the scraper means so that the drive may be moved from building to building and includes cable tensioning means that, desirably, is responsive to the load.

Patented Sept. 29, 1970

3,530,832

Sheet 2 of 3

Inventor:
Allen H. DeSatnick,
by Abbott Spear, Attorney

Patented Sept. 29, 1970

3,530,832

Inventor:
Allen H. DeSatnick,
by
Attorney

APPARATUS FOR USE IN REMOVING MANURE FROM BUILDINGS HAVING MANURE COLLECTING CHANNELS

The present invention relates to apparatus for use in removing manure from manure-collecting channels in buildings of which those provided at egg farms are excellent examples of the problems involved.

Efficient egg production requires that large numbers of laying hens be housed in a single building and an egg farm usually has several such buildings. These buildings commonly have two floors with four rows of compartmented hen cages extending lengthwise thereof and supported above manure collecting channels. The cleaning of these channels presents problems as it is work that is both unpleasant and difficult and represents a substantial cost to the operator.

The manure collecting channels may be 300 feet or more in length, 6 feet in width, and they may range from 6 inches to several feet in depth. Hen manure weighs in the approximate range of 120 to 150 pounds per cubic foot. While apparatus has been provided for cleaning manure from channels, such equipment has not been capable of meeting the heavy duty requirements that exist when manure has accumulated to a substantial depth in the channels so that cleaning on, at best, an 8 week basis was necessary to avoid accumulations that could not be handled. Practical requirements dictate that manure be allowed to accumulate for much longer periods, say 4 to 8 months or even several years, for reasons ranging from a less frequent stirring up of dust within the house to a manure condition that, while dense and heavy, has insufficient odor to constitute a nuisance except during the period of channel cleaning. One factor in determining the length of time between cleanings is, of course, the capacity of the channels of a particular building.

The general objective of the present invention is to provide channel cleaning apparatus that is capable of efficient, heavy duty service, an objective attained by providing scraper means for each channel. Each scraper means is movable in either direction lengthwise of its channel but is operative to effect manure removal only on its travel towards the discharge end of its channel. Each scraper means is connected to a cable and, typically, a cable provides courses for several channels, each course extending lengthwise of its channel. Cable actuating means includes drum means and includes a control responsive to a load on the drive indicative of the return of a scraper means from its discharging position into a loaded position in the manure.

Manure may thus be removed from a channel by starting the cleaning operation with the scraper means spaced from the discharge end by a distance representing a load of manure which is then pushed into a discharging position. The scraper means is next moved in the other direction until it is in a loaded position in the manure whereupon the scraper means is again moved into its discharging position. Such movements of the scraper means are continued until the entire length of the channel has been cleaned and it will be appreciated that the back and forth travel of the scraper means increases with each load. While the load on the cable is reasonably constant on movement of the scraper means towards the discharge end of its travel, in the reverse direction, the load on the cable is relatively light until the resistance of the manure is encountered. It should be here noted, that usually the manure accumulation is substantially uniform throughout the length of each channel and from channel to channel. A control, responsive to the load increase on the reentry of the scraper means in the manure, enables the apparatus to be efficiently and accurately operated and may be made adjustable to meet the requirements of existing conditions.

Where, as is usually the case, a cable is supported in a building to provide a plurality of courses with the courses alternating in their direction of travel, the discharge ends of the channels may alternate with the scraper means so arranged that their operative positions are similarly reversed or the discharge ends of the channels may be at the same end of the building with the scraper means disposed so that all discharge in the same direction. In the former case sufficient power is required to move together all the loaded scraper means connected to a cable while in the latter case, the scraper means of every other channel is held inoperative requiring a longer cleaning time but with a lesser load on the drive. In addition, the former arrangement requires a disposal system that services both ends of the building.

The use of a control responsive to the loading position of the scraper means makes it possible to have automatic or semiautomatic and also remote-controlled operations and another objective of the invention is the provision of cable actuating means to enable such bases of operation to be practised. This objective is attained by providing the actuating means with a reverse that is controlled by means located to respond to the arrival of a scraper means in a dumping position as well as by the control means.

In the usual case, only one building is cleaned at a time and accordingly substantial economies result if a single cable actuating means can be employed for several buildings and another objective of the invention is to provide cable actuating means that may be located outside a building and moved from building to building. In accordance with the invention, this objective is attained by providing a first unit that is the drum means and the second unit separable therefrom which includes the drive and its controls.

Where cable actuating means are to be moved from building to building, the drum means are detached from the cable means and yet another particular objective of the invention is to provide drum means that are power operated to effect cable tensioning and, preferably, the drum means is subject to a control operable to vary the cable tension automatically with the load thereon, whether or not embodied in a two-unit combination.

A further particular objective of the invention is to provide scraper means in the form of sleds slidable lengthwise of the channels with each sled having a transversely pivoted scraper blade. The blade has an operative position in which it is downwardly and forwardly inclined towards the discharge end of the channel, the operative position being established when the sled is moved in a manure discharging direction but with the blade end free to swing upwardly to ride over manure in the channel as it is moved back into a loaded position.

In the accompanying drawings, there is shown an illustrative embodiment of the invention from which these and other of its objectives, novel features, and advantages will be readily apparent.

Figure 2:
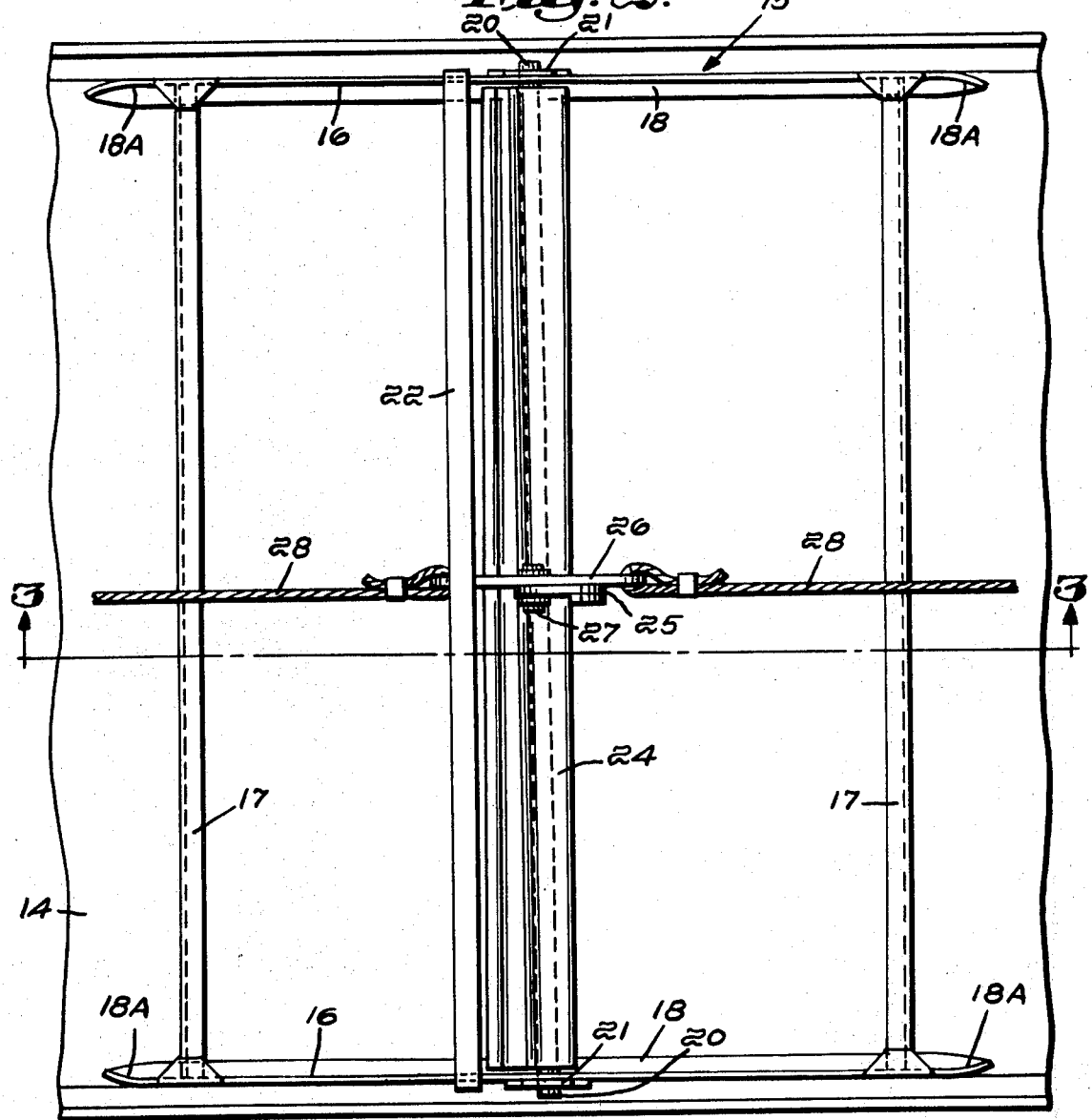
Figure 3:
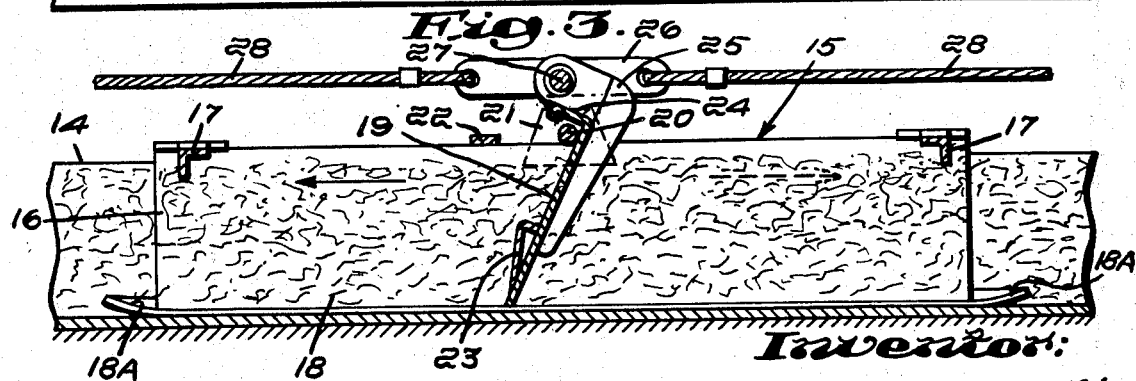
Figure 4:
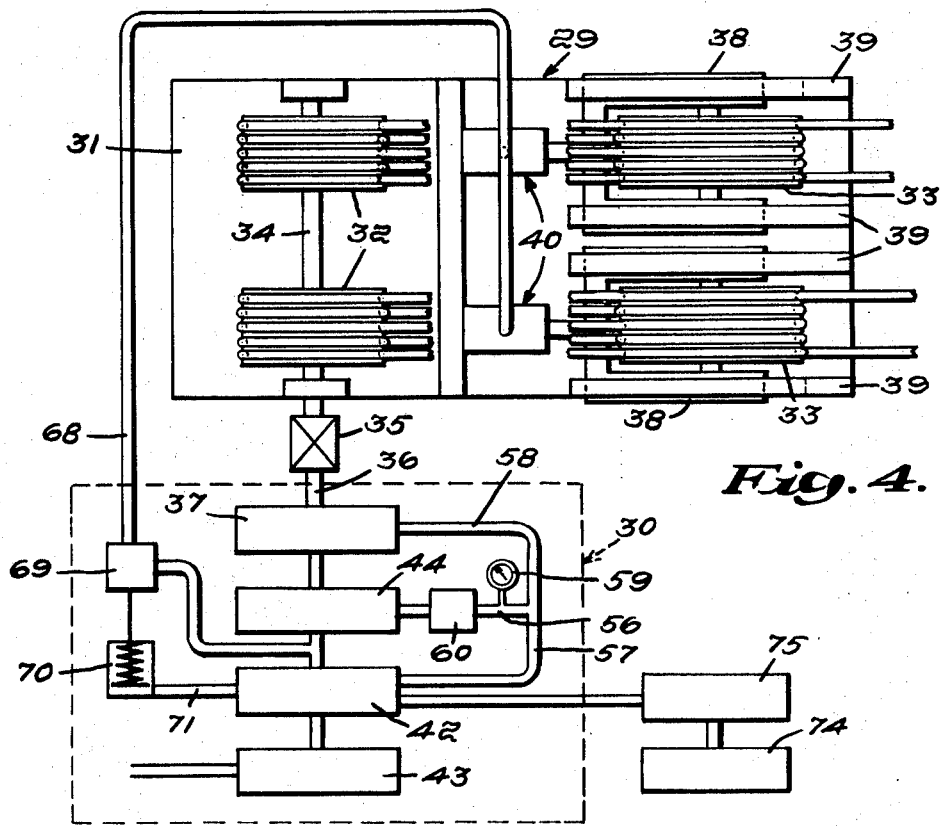
Figure 5:
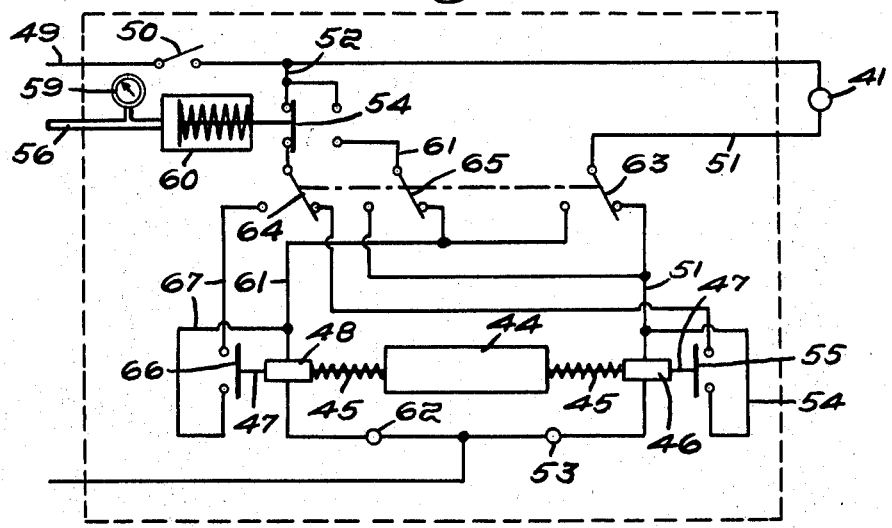

In the drawings:

FIG. 1 is a fragmentary and partly sectioned view of a poultry-housing building whose manure collecting channels are serviced in accordance with the invention, FIG. 2 is a top elevational view of one of the scraper sleds on a substantially increased scale, FIG. 3 is a section taken approximately along the indicated lines 3–3 of FIG. 2, FIG. 4 is a somewhat schematic view illustrating the cable actuating means, and FIG. 5 is a similar view of the circuitry.

The building generally indicated at 10 in FIG. 1 is illustrative of a type used to accommodate large numbers of laying hens. Such a building commonly has two floors 11 and 12 with each floor having parallel rows of compartmented cages 13 and a channel 14 below each row to receive the manure from the cages 13. As stated before, these channels are of substantial length, 300 feet or more and 6 feet in width, with the depth varying from 6 inches to several feet.

In accordance with the invention, each channel 14 is provided with a sled, generally indicated at 15 and shown as a sliding fit within its channel 14. Each sled, as may best be seen in FIGS. 2 and 3, includes sides 16 interconnected by transverse members 17 and having supporting runners 18 attached thereto exposed along the inner surfaces of the sides. The runners 18 extend beyond the sides of the sleds and their ends 18A are shown as inwardly and upwardly curved.

A transversely disposed scraper blade 19 includes a pivot 20 whose ends are rotatably held in transversely aligned mounts 21 secured to the sides 16. Each blade 19 is so dimensioned that is extends from side to side of a sled and engages the runners 18 and is held thereby to provide a normal or operative position in which it is downwardly and forwardly inclined towards the discharge end of its channel 14, see FIG. 3. Upward pivoting of the blade 19 is limited by the transverse stop 22 operative to hold the blade 19 slightly inclined downwardly towards the discharge end of its channel 14 even in its upper, inoperative position. The stop 22 also serves as an anchor to which the blade 19 may be attached when the sled 15 is to be placed out of service.

In practice, a reinforcing point 23, triangular in cross section, is welded to the leading face of the blade 19 along its bottom edge and the upper edge of the blade 19 is in the form of a U-shaped channel 24 opening downwardly on the leading side of the blade with the pivot 20 welded therein. An L-shaped mount 25 is welded to the center of the trailing face of the blade 19 and to the upper surface of the reinforcing channel 24. A link 26 is secured to the mount 25 by a pivot 27 and ends of a cable 28 are secured to the ends of the link.

From the foregoing, it will be apparent that when a sled 15 is pulled in the direction indicated by the broken line arrow in FIG. 3, the blade 19 is free to swing upwardly until it engages the stop 22, such upward swinging resulting from engagement of the blade 19 with manure in that channel 14, the blade then riding on top of the manure. When, however, the sled 15 is pulled in the opposite direction, the direction indicated by the solid line arrow in FIG. 3, the edge of the blade 19 catches in the manure and is forced downwardly into its operative position, its solid line position in FIG. 3, as the sled 15 is pulled towards the discharge end of its channel 14.

In FIG. 1, the discharge ends of the channels 14 alternate and, accordingly, the operative position of each sled 15 is reversed relative to the adjacent sled. With this arrangement, all the sleds 15 that are connected to a single cable 28 discharge at the same time but at opposite ends of the building 10. Where this arrangement requires too much power or when disposal systems do not exist or are not wanted at both ends of the building 10, the discharge end of all channels 14 may be at the same end of the building 10 and the sleds 15 all disposed to be operative in the same direction. With this arrangement, half of the sleds 15 are discharging manure while the remainder are in their loading positions. For reasons subsequently to be explained the last referred-to sleds are rendered inoperative, as by tying their blades 19 to their stops 22.

The cables are connected to drum means generally indicated at 29 and shown in FIG. 4 as one unit and the drive for the drum means is shown as a second unit, generally indicated at 30. The drum means 29 has a base 31 and two pairs of grooved drums 32 and 33 with corresponding ones of the two pairs having a cable 28 trained about them. The drums 32 are mounted on a common shaft 34 connected by a universal joint 35 to the drive shaft 36 of a hydraulic motor, generally indicated at 37. As the motor 37 is conventional, it is not herein detailed. The universal joint 35 provides a convenient means by which the two units may be detachably interconnected.

Each drum 33 is rotatably supported by a slide 38 held for fore and aft movement in mounts 39 and backed by a generally indicated hydraulic ram 40 by which the spacing of the drums 32 and 33 may be a varied to tension each cable 28 to prevent slippage or to permit slippage if a cable 28 is to be placed out of service. The rams 40 also function to tension the cables in proportion to the load, as will presently be described.

It will be appreciated that it would be undesirable and difficult to have the movement of the sleds controlled by observation and that remote control of the sleds is preferable for several reasons. In any event, it is necessary to stop the sleds 15 when they are in their discharging position. Means to limit travel of the sleds towards the discharge ends of the channels 14 is shown as effected by photo-electric cells 41, one for each channel 14 in a manner presently to be described. It is also necessary to stop the sleds 14 when they have been returned into a loading position in the manure, a position that is continually becoming more remote from the discharge ends of the channels as their cleaning progresses. The control for so doing will be described as important details of the driven unit 30 are discussed.

The hydraulic motor 37 has a source of oil under pressure, generally indicated at 42, the pump which is driven by an electric motor 43 and the direction in which the hydraulic motor 37 is driven is controlled by a valve generally indicated at 44. Such reversible hydraulic motors are conventional and are not herein detailed other than to note that the valve 44 has, as indicated in FIG. 5, a central neutral position, indicated as being yieldably maintained by springs 45 in which the liquid is circulated back to the source 42 and two operative end positions, each providing for the delivery of the liquid to the hydraulic motor 37 and back to the source 42 in a direction opposite to that established by the other. In addition, a solenoid 46 in control of the valve stem 47 at one end of the valve 44 establishes, when energized, one operative valve position and a solenoid 48, at the other end of the valve stem, effects, when energized, the other operative valve position.

In accordance with the invention and as indicated in FIG. 5, a circuit 49 is provided with a control switch 50 and a pair of parallel leads 51 and 52.

The lead 51 includes photo-electric cells 41, the solenoid 46 and a signal light 53 so that whenever sleds 15 reach their discharging position, the photo-electric cells 41 respond to reverse the drive. The lead 52 includes a switch 54, a switch 55 closed when the valve is positioned by the energization of the solenoid 46 and connected to the lead 51 to function as a holding circuit for the solenoid 46 until the switch 54 is opened.

It will be apparent that initial sled movement away from the discharge ends of the channels encounters substantially less resistance than is met when the sleds again enter the manure. This change in resistance is reflected by a change in the oil pressure which, in the embodiment of the invention illustrated by FIG. 4, is taken as the difference between the motor and pump pressures. A conduit 56 having branches 57 and 58 connected, respectively, to the motor 37 and the source 42 to respond to the pumped pressure thereof, is indicated as having a gauge 59 showing the pressure and a pressure responsive control 60 connected to the switch 54 to cause it to open the lead 52 and to close a parallel lead 61 which includes the solenoid 48 and the signal lamp 62 thus to again reverse the drive to return the sleds to their discharging position whenever a predetermined load is attained. On the arrival of the sleds 15 in their discharging position, the pressure drops off as the manure loads are discharged with the result that the control 60 returns to its normal position permitting the photo-electric cells 41 to again assume control.

It will thus be appreciated that while operation could be effected manually by observing the gauge 59, automatic operation is preferred and, of course, the control 60 may be adjusted to respond to whatever pressure represents the desired manure loads for the sleds 15.

The above described circuitry is adapted for use where all the sleds 15 attached to a cable 28 are moved together towards their discharging position. As the circuitry, except for the photo-electric cells 41 and the portions of their leads within the building 10 is part of the unit 30 it is desirable to have the circuitry adapted for use where the discharge ends of the channels are all at the same end of the building 10 and only alternate ones of the sleds 15 are operable at a time. In that case, it is necessary to reverse the valve position controlled by the photo-electric cells 41 when the inoperable sleds 15 are to be brought back into service and the blades 19 of the remaining sleds 15 held in their inoperative positions.

To achieve that result, the leads 51, 52, and 61 are provided with switches 63, 64, and 65, respectively, indicated as being connected to be operated together thus to enable all of them to be moved together from their first position, that shown in FIG. 5, into their second positions.

In the second position of the switch 63 the solenoid 48 instead of the solenoid 46 is in series with the photo-electric cells 41 in the second position of the switch 64, the switch 66 instead of the switch 55 is in series with the switch 54, in the normal position thereof, and the switch 65 places the solenoid 46 instead of the solenoid 48 in series with the switch 54 when operated by the control 60 in response to oil pressure indicating that the sleds 15 are in their loading positions in the manure. The switch 66 is in a lead 67 connected to the lead 61 to serve as a holding circuit for the solenoid 48.

In accordance with the invention, oil from the pump controlled source is also used to actuate the rams 40 to move the rolls 33 relative to the rolls 32 to tension the cables 28. To this end, the conduits 68 to the rams 40 have an adjustable pressure regulating valve 69 under the control of a pressure operated valve opeator 70 connected by a conduit 71 to the source of oil under pressure. The pressure on the liquid delivered to the rams 40 thus varies with the pump pressure as a measure of the load on the cables to increase the tension on the cables to prevent slippage when the load requires it without causing excessive cable and pulley wear as would result if the cable were manitained under such increased tension at all times in anticipation of maximum loads.

In use, the drum means 29 are positioned outside a building 10 and the cables 28 are trained about the rolls 32 and 33 and tensioned to a desired extent by means of the rams 40. The unit 30 is also located outside the building and the drive shaft 36 of the hydraulic motor 27 is detachably connected to the drum shaft 34 by means of the universal joint 35, and with the leads in the building 10 including the photo-electric cells 41 connected to complete the circuit 49 the apparatus is ready for use. It will be appreciated that the units 29 and 30 may be as readily detached and moved from one building to another building to actuate the cables thereof.

The disposal of manure removed by the sleds 15 from the channels 14 is also a problem. In FIG. 1, there is shown a tank 72 below both ends of all the channels 14 with each tank 72 having a discharge conduit 73 controlled by a mud pump 74 driven by a hydraulic motor 75 which may also be driven by oil under pressure from the pump controlled source 42. The first floor channels 14 discharge directly into the tanks 72 while those on the second floor 12 desirably have discharge chutes 76 connected thereto.

From the foregoing, it will be appreciated that apparatus in accordance with the invention is well adapted to meet a wide range of requirements in cleaning channels, such as manure collecting channels, by starting with one or more sleds at the discharge ends of their channels and moving the sleds away therefrom until a predetermined load in the apparatus indicates that the sleds are in their loading position. Each sled load or bite depends on channel dimensions and manure accumulations and is at least 8 feet long and may be several times that length. The drive is then reversed and the sleds moved into their discharging position and this procedure is repeated until the entire length of a channel has been cleaned. The apparatus is capable of such heavy duty service that the manure can collect until the channels are full with a capability of cleaning eight 400 foot channels in about a day and a half, with maximum loading of the sleds.

I claim:

1. Apparatus for use in removing manure from a building having at least one collecting channel provided with a discharge end, said apparatus comprising scraper means in said channel movable in either direction lengthwise thereof but operative to effect manure removal only on travel towards the discharge end, a cable supported in said building to provide a course extending lengthwise thereof, the scraper means being connected to said cable course, cable actuating means including drum means about which the cable is trained, and a reversible drive connected to said drum means including a control responsive to a manure reentry load on said drive indicative of the return of the scraper means into loaded position in the manure.

2. The apparatus of claim 1 in which the control is remote from the channels and gives a visual indication.

3. The apparatus of claim 1 in which the control is operatively connected to the drive to interrupt the drive.

4. The apparatus of claim 1 in which the control is operatively connected to the drive to interrupt and reverse the drive.

5. The apparatus of claim 1 in which the drive includes means to reverse the direction of travel of the scraper means when a scraper means is in a discharging position at said discharge end and the control is operatively connected to the drive to interrupt and again reverse the drive.

6. The apparatus of claim 1 in which there are two channels, two scraper means, one for each channel, each scraper means includes means to render it inoperative on travel towards its discharge end, and the cable has a course for each channel, the direction of travel of the courses being reversed so that the scraper means in one channel travels in a direction that is the reverse of that of the other channel, the two channels having their discharge ends at the corresponding ends, the drive includes means in one channel to reverse the direction of travel of the scraper means when a scraper means is in a discharging position at the discharge end of its channel and the control is operatively connected to the drive to interrupt and again reverse the drive, and means operable to reverse the function of the reverse means and of the control between a first position for one channel operation and a second position for the other channel operation whereby the scraper means of first one and then the other channel may be held inoperative in a manure discharging direction.

7. The apparatus of claim 1 in which the drum means includes a support, a pair of spaced drums about both of which the cable is trained and which are connected to the support so that one drum is movable towards and away from the other, and means mounted on the support and connected to one drum for moving it towards and away from the other drum to vary the tension on the cable.

8. The apparatus of claim 7 in which the tension varying means includes a control responsible to the load on the drive.

9. The apparatus of claim 7 in which the tension varying means is a hydraulic ram.

10. The apparatus of claim 9 in which the drive is hydraulically operated, the tension varying means includes a control responsive to the pressure developed by the drive.

11. The apparatus of claim 1 in which the drive includes a hydraulic motor, a pump controlled liquid source, and a valve connected to the source and to the motor and having a neutral position in which the liquid is returned directly to the source and two operative positions, one effecting hydraulic motor operation in a direction that is the reverse of that provided by the other, and the control is responsive to the pressure differential between the pump controlled source and the hydraulic motor and effects one of the two operative valve positions.

12. The apparatus of claim 1 in which there is a control circuit including a photo-electric cell at the discharge end of at least one of said channels closed by the arrival of the scraper means at that end, the drive includes a hydraulic motor, a pump controlled source of liquid, and a valve operable to interconnect the pump and source, the valve having a neutral position and and two operative positions in one of which the liquid flow effects motor operation in a direction opposite to the other, electrically operated means effects one operative position and normally in the circuit inclusive of the cell, second electrically operated means to effect the other operative position, and the control is responsive to the pressure differential between the pump and the motor and is operative to open the circuit to the first electrically operated means and to place the second electrically operated means in the circuit.

13. The apparatus of claim 12 in which all of the scraper means discharge in the same direction.

14. The apparatus of claim 12 in which there are two channels and two scraper means, one for each channel and the cable has a course for each channel to which the appropriate scraper means is connected, the direction of travel of the course being reversed so that the direction of discharge of the scraper means is opposite, and the electrically operated means includes switch controlled circuitry operative to reverse the operation of the valve by the photo-electric cell and the control.

15. Apparatus for use in removing manure from a collecting channel having a discharge end, said apparatus comprising a sled slidable lengthwise of said channel and including a scraper blade of a length approximately equal to the channel width and a pivotal connection between the blade and the sled supporting the blade within and transversely of said channel to swing upwardly from an operative position in which it is downwardly and forwardly inclined towards said discharge end, said sled including a pair of runners engageable with the bottom of the channel at the sides thereof and engageable by the ends of the bottom edge of the blade in the operative position thereof and means connected to said sled to move it lengthwise of said channel in both directions thereby to enable said sled to be moved away from said discharge end with the blade free to swing upwardly to ride over manure in said channel and then to be moved towards said discharge end.

16. The apparatus of claim 15 and a link, a transverse pivoted connection between the middle of the link and the upper portion of the blade substantially midway between the ends of the blade, and cable ends, one for each end of the link and connected thereto.